US008563094B2

(12) United States Patent
Jabado et al.

(10) Patent No.: US 8,563,094 B2
(45) Date of Patent: Oct. 22, 2013

(54) METHOD FOR PRODUCING A COMPONENT WITH A NANOSTRUCTURED COATING

(75) Inventors: Rene Jabado, Berlin (DE); Jens Dahl Jensen, Berlin (DE); Ursus Krüger, Berlin (DE); Daniel Körtvelyessy, Berlin (DE); Volkmar Lüthen, Berlin (DE); Ralph Reiche, Berlin (DE); Michael Rindler, Schöneiche (DE); Raymond Ullrich, Schönwalde (DE)

(73) Assignee: Siemens Aktiengesellschaft, Munich (DE)

( * ) Notice: Subject to any disclaimer, the term of this patent is extended or adjusted under 35 U.S.C. 154(b) by 682 days.

(21) Appl. No.: 12/305,441

(22) PCT Filed: Jun. 20, 2007

(86) PCT No.: PCT/EP2007/056150
§ 371 (c)(1), (2), (4) Date: Mar. 16, 2010

(87) PCT Pub. No.: WO2007/147852
PCT Pub. Date: Dec. 27, 2007

(65) Prior Publication Data

US 2010/0189920 A1 Jul. 29, 2010

(30) Foreign Application Priority Data

Jun. 22, 2006 (DE) ........................ 10 2006 029 572

(51) Int. Cl.
*C08J 7/18* (2006.01)

(52) U.S. Cl.
USPC .......................................... 427/554; 427/189

(58) Field of Classification Search
USPC ......... 427/554, 553, 180, 189, 190, 191, 192, 427/533
See application file for complete search history.

(56) References Cited

U.S. PATENT DOCUMENTS

| | | | | |
|---|---|---|---|---|
| 7,629,027 | B2 * | 12/2009 | Moran et al. | 427/256 |
| 2003/0124259 | A1 * | 7/2003 | Kodas et al. | 427/376.6 |
| 2004/0029993 | A1 | 2/2004 | Klee et al. | 523/113 |

(Continued)

FOREIGN PATENT DOCUMENTS

| | | | |
|---|---|---|---|
| BE | 654533 | A | 2/1965 |
| BE | 666375 | A | 2/1965 |

(Continued)

OTHER PUBLICATIONS

German Document, Application No. 10 2006 029 572.2 (no translation), 3 pages, Feb. 26, 2007.
German PCT (no translation), PCT/EP2007/056150, 12 pages, Oct. 12, 2007.

*Primary Examiner* — Dah-Wei Yuan
*Assistant Examiner* — Nga Leung V Law
(74) *Attorney, Agent, or Firm* — King & Spalding L.L.P.

(57) ABSTRACT

In a method for producing a component (20) with a coating (24) containing nanoparticles (21), it is provided that, in order to introduce the nanoparticles (21) into the coating (24), a film (19) with the dispersely distributed nanoparticles (21) is applied to the surface (22) to be coated, which decomposes with incorporation of the nanoparticles (21) during the actual coating operation and is thereby not incorporated into the layer.

4 Claims, 2 Drawing Sheets

(56) References Cited

U.S. PATENT DOCUMENTS

| | | | | |
|---|---|---|---|---|
| 2004/0084774 | A1* | 5/2004 | Li et al. | 257/758 |
| 2004/0137710 | A1* | 7/2004 | Grigoropoulos et al. | 438/622 |
| 2004/0259996 | A1 | 12/2004 | Stoppelmann et al. | 524/430 |
| 2005/0271887 | A1 | 12/2005 | Ulrich et al. | 428/474.4 |
| 2005/0287308 | A1 | 12/2005 | Becker et al. | 427/47 |
| 2006/0264553 | A1 | 11/2006 | Karger-Kocsis | 524/442 |
| 2007/0013094 | A1 | 1/2007 | Bischofsberger et al. | 264/29.6 |
| 2008/0023087 | A1 | 1/2008 | Jensen et al. | 137/807 |

FOREIGN PATENT DOCUMENTS

| | | | |
|---|---|---|---|
| DE | 10322182 | A1 | 12/2004 |
| DE | 10348548 | A1 | 5/2005 |
| DE | 102004025001 | A1 | 12/2005 |
| DE | 60109793 | T2 | 2/2006 |
| EP | 1394197 | A1 | 7/2003 |
| EP | 1598166 | A1 | 5/2005 |
| GB | 2399541 | A | 9/2004 |
| WO | 2005123978 | A1 | 12/2005 |
| WO | 2007/013881 | A2 | 2/2007 |

* cited by examiner

METHOD FOR PRODUCING A COMPONENT WITH A NANOSTRUCTURED COATING

CROSS-REFERENCE TO RELATED APPLICATIONS

This application is a U.S. National Stage Application of International Application No. PCT/EP2007/056150 filed Jun. 20, 2007, which designates the United States of America, and claims priority to German Application No. 10 2006 029 572.2 filed Jun. 22, 2006, the contents of which are hereby incorporated by reference in their entirety.

TECHNICAL FIELD

The invention relates to a process for producing a component with a nanostructured coating, in which the nanostructuring of the coating is produced using nanoparticles. The invention also relates to polymer films into which nanoparticles are introduced.

BACKGROUND

DE 601 09 793 T2 discloses impregnating polymer films with encapsulated bioactive substances. In this process, a porous, flat PTFE film is used, and in this case the nanoparticles may be incorporated into the pores of the polymer film.

In addition, DE 10 2004 025 001 A1 discloses that it is possible to introduce nanoscale particles into a polymer layer by melting polymers containing the nanoscale particles and applying them to a surface at a speed of 250 m/min. A coating containing the particles is formed on the surface.

Finally, DE 103 22 182 A1 discloses that a coating composed of a polymer material and particles incorporated therein may be subjected to pyrolysis and/or carbonization after it has been applied to a surface. In this case, the polymer is converted and a porous carbon-based material is produced as the matrix for the particles.

SUMMARY

According to various embodiments, a process for producing nanostructured coatings with any desired layer materials can be specified, this process making simple coating possible with a comparatively free selection of the layer materials and making it possible to produce a uniform distribution of the nanoparticles in the coating.

According to an embodiment, a process for producing a component with a nanostructured coating, in which the nanostructuring of the coating is produced using nanoparticles, may comprise the following process steps: first of all, a film filled with the nanoparticles to be used is produced from a polymer material, the film is applied to the surface of the component to be coated, and the polymer which forms the film is removed from the surface by means of further treatment, wherein the nanoparticles form the coating.

According to a further embodiment, the further treatment may consist in a heat treatment of the component. According to a further embodiment, the further treatment may be carried out using a laser beam. According to a further embodiment, the further treatment may be carried out using a particle beam, in particular a coating beam of cold gas. According to a further embodiment, the nanoparticles may be introduced into the polymer material by being added directly to the polymer melt during the process for extruding the polymer material. According to a further embodiment, the film may be produced from the polymer melt. According to a further embodiment, granules, which later serve as starting material for extruding the film, can be produced from the polymer melt.

BRIEF DESCRIPTION OF THE DRAWINGS

Further details of the invention are described below with reference to the drawing. Identical or corresponding elements of the drawing are each provided with the same reference symbols and are explained several times only where there are differences between the individual figures, in which FIGS. 1 and 2 use selected, schematically illustrated process steps to show exemplary embodiments of the process for producing a polymer film filled with nanoparticles, and FIG. 3 uses selected, schematically illustrated process steps to show exemplary embodiments of the process for producing the coating filled with nanoparticles.

DETAILED DESCRIPTION

Figure 1:
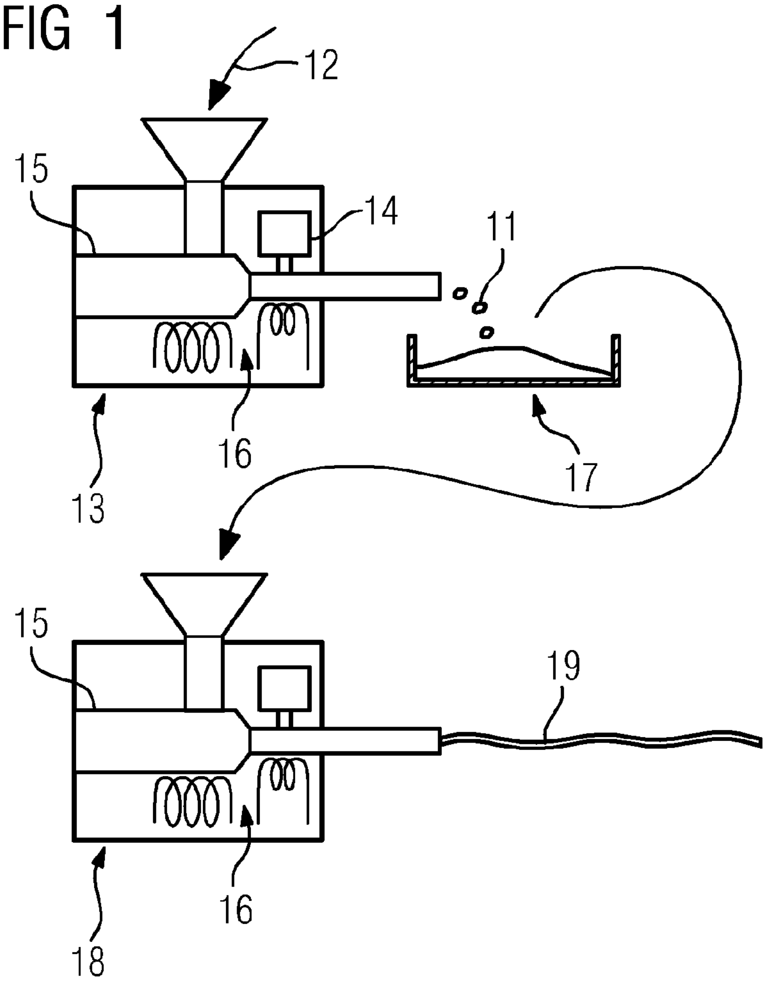

According to various embodiments, the following process steps can be carried out in order to produce the nanostructuring of the coating using nanoparticles. First of all, a film filled with the nanoparticles to be used is produced from a polymer material. The film is then applied to the surface of the component to be coated. Finally, the polymer which forms the film is removed from the surface by means of further treatment, wherein the nanoparticles form the coating. In this case, the layer constituents do not exclusively have to be formed by the nanoparticles. During the further treatment of the surface, it is also possible to introduce a further layer material into the process, and this material, for example, forms a matrix into which the nanoparticles are introduced. In this case, the nanostructuring consists of the finely disperse distribution of the nanoparticles. However, the nanostructuring may also be produced by the nanoparticles when the latter form the coating. This is due to interactions between the nanoparticles which have a pronounced effect during layer formation owing to the surface area, which is large in relation to the volume of the nanoparticles. In addition, the further treatment may also bring about partial melting of nanoparticles, and this makes layer cohesion possible even without using further coating materials which could form a matrix for binding the nanoparticles.

According to one embodiment, the further treatment consists in a heat treatment of the component. In this case, the polymer material is destroyed by thermal loading which exceeds levels that the polymer material is able to withstand. Heat treatment may be advantageously very simple to carry out and can be particularly suitable for large-area components since, during heat treatment, the attack takes place over the whole surface area.

According to another embodiment, the further treatment may also be carried out using a laser beam or a particle beam, in particular a coating beam of cold gas. If a laser beam is used for the further treatment, this merely serves for introducing the energy required for decomposing and removing the polymer material. In this case, the coating is formed merely by the nanoparticles.

If a particle beam is used for further treatment, the thermal or kinetic energy of said particle beam has a positive effect on the decomposition of the polymer material. With the prerequisite that suitable process parameters have been selected, the particles of the particle beam are simultaneously deposited on the surface of the component and this produces a composite structure between the coating particles and the nanoparticles.

The uniform distribution of the nanoparticles in this layer composite structure is ensured by uniform distribution in the polymer film.

According to another embodiment, the nanoparticles are introduced into the polymer material by being added directly to the polymer melt during the process for extruding the polymer material. An extrusion process is the most common process for producing semi-finished products from polymers. In this process, a polymer melt is produced from the starting material of the polymer and then extruded, the polymer melt being suitable, in principle, for picking up the nanoparticles. In this case, the mixing processes used during extrusion are used simultaneously in order to achieve uniform distribution of the nanoparticles in the melt.

In order to make it possible to add nanoparticles to the polymer melt without the nanoparticles agglomerating, a transport and metering system as described, for example, in WO 2005/123978 A1 may be used. Another option is to produce an aqueous dispersion from the nanoparticles, as a result of which these nanoparticles may be added to the polymer melt using a pump delivery system, for example. In the further process for producing the polymer melt mixed with nanoparticles, the water evaporates owing to the temperature development. This process is described in more detail in DE 103 48 548 A1. In addition, it is also possible to produce a mixture with a finely disperse distribution of the nanoparticles from the nanoparticles and the polymer melt by means of stirring. In this case, adhesion promoters which facilitate dispersion of the nanoparticles in the polymer melt may also be used in order to assist the process. It is then possible for the polymer melt to be further processed in a known manner, for example by means of an extruder. This process is known from EP 1 394 197 A1.

The film for use in the coating process may be produced directly from the polymer melt which has previously been mixed with the nanoparticles. Alternatively, it is also possible to process the polymer melt to form plastic granules which, for their part, may in turn form the starting material for producing the film. This advantageously may make it possible to produce the polymer film according to an embodiment using conventional extrusion machines which are not fitted with a suitable metering device for the nanoparticles. This can be advantageous since it allows a person using the process according to an embodiment to obtain suitable granular raw materials without being burdened by the costs of procuring a modified extrusion machine. Various granular materials with different nanoparticles may be mixed during the process for producing the polymer film, and this simplifies storage. The films required for this application may each be produced directly before processing.

It may be advantageous, in the case of a process for producing a film filled with nanoparticles or granules filled with nanoparticles, if the nanoparticles are introduced into the film or the granules by being added directly to the polymer melt during the process for extruding the polymer material. The advantages associated with this process have already been explained in conjunction with the coating process according to an embodiment.

FIG. 1 illustrates how granules 11 may be produced from a polymer material 12, an extrusion machine 13 being used for this purpose. This extrusion machine 13 has been modified in comparison with conventional extrusion machines to the effect that a metering device 14 is provided, and this metering device may be used to feed nanoparticles to the polymer melt (in a manner not illustrated in more detail) during thorough mixing in the extrusion machine 13. The polymer melt is produced by means of an extruder screw 15, which is not illustrated in more detail and in which the polymer material 12 is also mixed, and a heating device 16. The granules 11 produced forms a stock 17 which may later form the starting material for a further extrusion process using a conventional extrusion machine 18. The extrusion machine 18 is used to produce a film of granules 11 which is filled with nanoparticles.

Figure 2:
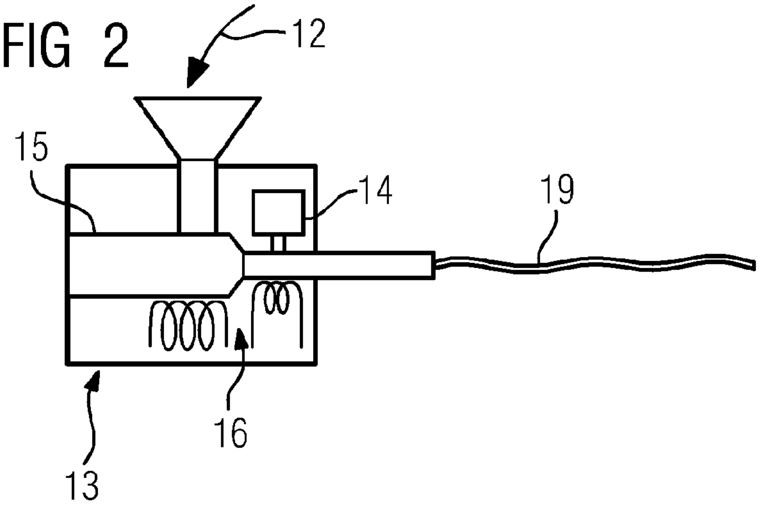

FIG. 2 illustrates an alternative process for producing the film 19. This differs from the process according to FIG. 1 merely in that the modified extrusion machine 13, by means of which nanoparticles may be added, may also be used to produce the film 19 filled with nanoparticles.

Figure 3:
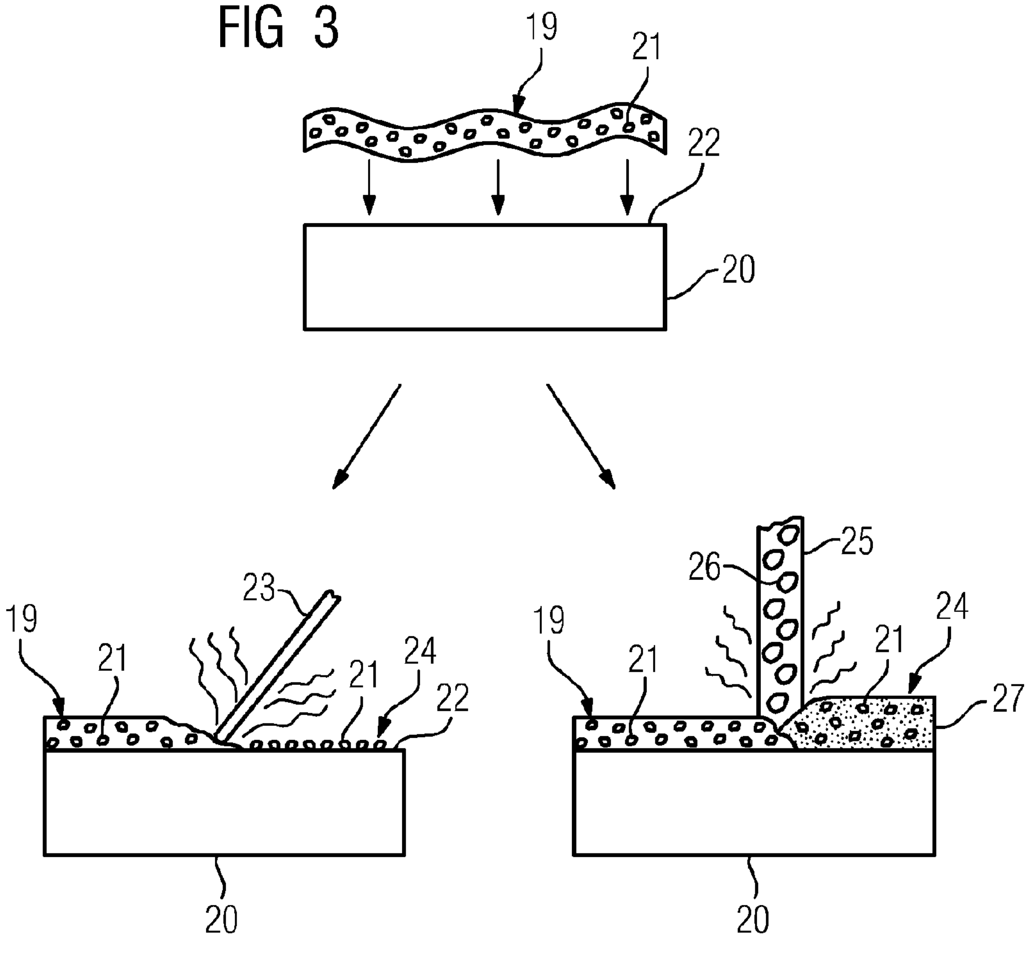

FIG. 3 schematically illustrates the coating of a component 20 with the film 19 in which the nanoparticles 21 are uniformly distributed. For this purpose, the film 19 is first of all applied to the surface 22 of the component 20 to be coated and remains adhering on the surface 22 owing to its adhesiveness.

The film may be further processed, for example using a laser beam 23, as a result of which the polymer material of the film evaporates. In this case, the nanoparticles 21 remain adhering on the surface 22 of the component 20 and form a thin coating 24. Alternatively (not illustrated), the introduction of energy provided by the laser beam may also be so great that the nanoparticles 21 are melted and therefore form a closed layer on the surface 22 of the component 20.

According to a different alternative, a particle beam 25 which comprises microparticles 26 for forming a layer matrix of the coating 24 may also be used for further treatment. The layer matrix 27 which forms contains the nanoparticles 21. The material of the film 19 evaporates when impacted by the particle beam.

What is claimed is:

1. A process for producing a component with a nanostructured coating, in which the nanostructuring of the coating is produced using nanoparticles, comprising the following process steps:

introducing nanoparticles into a polymer melt of a polymer material;

producing a film from the polymer melt, the film including the nanoparticles suspended in the polymer material, applying the film to the surface of the component to be coated, and applying a laser beam to the film to remove the polymer material but not the nanoparticles suspended in the polymer, such that the nanoparticles remain as a coating on the component.

2. The process according to claim 1, wherein the nanoparticles are introduced into the polymer melt during a process for extruding the polymer material.

3. The process according to claim 2, wherein the film is produced from the polymer melt.

4. The process according to claim 2, wherein granules, which later serve as starting material for a further extruding process that generates the film, are produced from the polymer melt.

* * * * *